3,338,645
BEARING FOR VERTICAL SHAFT
Hans-Hermann Pribnow, Nussbaumen, Aargau, Switzerland, assignor to Aktiengesellschaft Brown, Boveri & Cie., Baden, Switzerland, a joint-stock company
Filed Aug. 18, 1965, Ser. No. 480,631
Claims priority, application Switzerland, Sept. 30, 1964, 12,719/64
5 Claims. (Cl. 308—160)

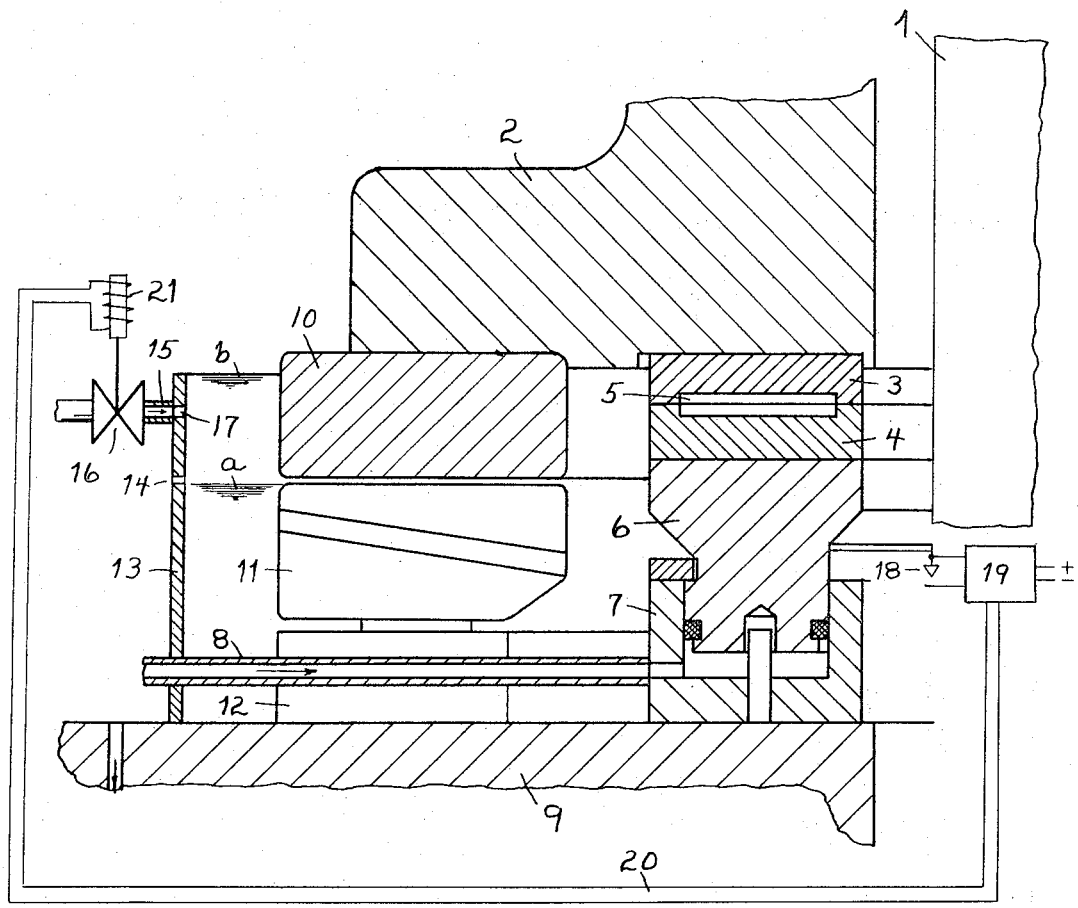

The present invention relates to a suspension bearing structure for vertical shafts, particularly the shafts of large-sized electric generators such as those of the hydro-electric type and is an improvement upon the bearing construction as disclosed in United States Patent No. 3,165,365 granted Jan. 12, 1965 in the names of Eugen Wiedemann et al. As disclosed in that patent, the suspension bearing structure comprises, in combination, a hydrostatic normal-service bearing, and a hydrodynamic emergency-service bearing of the segmental type which automatically takes over the load imposed by the shaft when the hydrostatic bearing for any reason, is no longer able to accept load, e.g. upon a failure of the pressure-oil pump.

The combination bearing structure as disclosed in the aforesaid patent, operates in such manner that during normal operation, the bearing surfaces of the hydrostatic bearing carry the entire load imposed by the shaft, and the emergency service segmental bearing, which concentrically surrounds the hydrostatic bearing, idles along, without load and under oil. It has been found that due to the viscosity of the oil and the configuration of the segment bearing, considerable power losses are involved in dragging the bearing race of the hydrodynamic bearing through the oil bath, and such power losses may well be of the same order of magnitude as the losses attributable to the normal-service hydrostatic bearing when under load.

The object of the present invention is to avoid these losses as much as possible, and this objective is attained through the novel concept of lowering the level of the oil in the bearing oil bath to the bearing surfaces of the segmental bearing during such times as the hydrostatic bearing is carrying the load imposed by the shaft. In this manner, the rotating race of the emergency-service hydrodynamic bearing will no longer be submerged in the oil bath provided for this bearing. In the event of a failure of the normal-service hydrostatic bearing, the level of the oil bath is raised to a proper level resulting in immersion of substantially all of the rotating bearing race of the hydrodynamic bearing.

One embodiment of the invention which provides for this novel control over the level of the oil bath for the composite bearing structure is illustrated in the attached drawing.

With reference to the drawing, the rotatable load carrying head for the vertical shaft 1 is indicated at 2, and is secured to the shaft by suitable means, not illustrated. Secured to the underface of the head 2 is an annular race 3 of the normal-service hydrostatic bearing. The underface of race 3 bears against the upper face of a non-rotatable bearing ring 4 and the adjoining faces of race 3 and ring 4 establish the bearing surfaces of the hydrostatic bearing. An annular chamber 5 formed between race 3 and ring 4 receives oil under pressure so as to lubricate the bearing surfaces. Located beneath ring 4 is a non-rotatable annular type piston 6 which operates in an annular cylinder 7 to which oil under pressure is introduced through a supply line 8. Cylinder 7 is supported by a bearing spider 9. For normal operation, oil is introduced under pressure through supply line 8 into cylinder 7 causing annular piston 6 to raise and hence also lift the non-rotatable bearing ring 4 and rotatable race 3, as well as head 2 and the shaft 1 to a level such that the race 10 of the hydrodynamic bearing more particularly described below runs out of contact with the mating bearing segments 11 whereby the hydrostatic bearing then carries the entire load.

The emergency-service, hydrodynamic bearing which lies radially outward from the hydrostatic bearing structure 3, 4 is comprised of the annular race 10 also secured to the underface of the bearing head 1 and non-rotatable bearing segments 11 which are held in place by an annular ring 12 secured to the bearing spider 9.

The oil bath for the bearing is established by a cylindrical container wall structure 13 upstanding on the bearing spider.

As indicated previously, the present invention provides for adjusting the level of the oil in this oil bath so that while the normal service hydrostatic bearing 3, 4 is in operation, the oil level is maintained at a level, indicated at $a$ located substantially at the upper surfaces of the non-rotatable bearing segments 11 so that the rotatable race 10 of this bearing operates above the surface of the oil. Level $a$ of the oil bath is maintained by providing a relatively small size overflow, or escape orifice 14 extending through the oil bath container wall 13.

In the event of a failure of the hydrostatic bearing structure—such as for example by loss of oil pressure in annular cylinder 7—which would cause the parts 1, 2, 3, 4 and 6 to lower, the emergency-service hydrodynamic bearing takes over the load of the shaft as soon as the underface of the lowering race 10 makes a contact with the upper surfaces of the bearing segments 11. In this situation, the level of the bearing oil bath must then be raised and this is accomplished by adding oil thereto through a supply line 15 controlled by a valve 16 which connects with an opening 17 in the wall of container 13 located at a level above the overflow orifice 14. The arrangement is such that oil is supplied through the valve-controlled line 15 at a rate greater than that at which oil can escape through the overflow orifice 14. Consequently, no difficulty is experienced in maintaining the level of the oil at a level $b$ which is located somewhat close to the upper edge of the bearing race 10 thus assuring adequate oil supply to the emergency-service bearing 10, 11 as long as the latter is required to operate. When the shaft load is transferred back to the normal-service hydrostatic bearing, valve 16 is re-closed thus stopping inflow of oil through line 15 and the level of the oil bath in container 13 gradually drops back again to level $a$ as it discharges through the overflow orifice 14.

Preferably, operation of the control valve 16 is effected automatically so as to open as soon as the parts 1, 2, 3, 4 and 6 lower as a result of failure of this normal-service bearing organization. Thus valve 16 can be controlled by the movement of any one of these components which operate as a unit. As indicated in the drawing, one way of obtaining the necessary control over the valve would be to control it in accordance with the up and down movements of the annular piston 6. Should piston 6 drop as a result of a failure of its operating pressure, relay contacts 18 will close, thus effecting through a control unit 19 an energization circuit 20 for a solenoid type actuating means 21 on the valve 16 causing the latter to open. In a similar manner, when the annular piston 6 is again raised to its normal operating level, relay contacts 18 re-open and the solenoid controlled actuating means 21 are de-energized thus effecting a re-closure of valve 16.

Using an oil-level control arrangement for the bearing oil bath in accordance with the invention effects a considerable reduction in the losses of the combination bearing thus resulting in an improvement of the entire machinery equipped therewith. The small increase in costs due to installation of the valve and its controls is immaterial because these parts are of standard commercial design and few in number.

I claim:
1. In a bearing structure for supporting a vertically disposed rotatable shaft, the combination comprising a normal-service hydrostatic bearing means having a lower annular non-rotatable bearing member surrounding said shaft and which coacts through a pressurized lubricant film with an upper annular rotary bearing member surrounding and secured to said shaft, an emergency-service hydrodynamic bearing means spaced radially in relation to said normal-service bearing means, said emergency-service bearing means having a lower circular array of circumferentially spaced stationary bearing segments surrounding said shaft and an upper annular rotary bearing member surrounding and secured to said shaft, said hydrostatic bearing means alone serving to carry the shaft load during normal service, and said hydrodynamic bearing means taking over the load only upon a failure of said hydrostatic bearing means and a resulting lowering of said shaft so as to bring said upper and lower bearing elements of said hydrodynamic bearing means into load supporting relationship, means establishing an oil bath for said upper and lower bearing elements of said hydrodynamic bearing means at a normal level substantially coinciding with the upper face of said lower bearing element of said hydrodynamic bearing when said normal-service hydrostatic bearing means is operating to carry the shaft load, and means responsive in the event of a failure of said hydrostatic bearing to raise the level of said oil bath above said normal level so as to effect substantial immersion of said upper bearing element of said hydrodynamic bearing means.

2. A bearing structure as defined in claim 1 for a vertically disposed rotatable shaft wherein said oil bath for said hydrostatic bearing means is established by a wall surrounding the same, said wall being provided with an over-flow aperture located at a level substantially coincident with the upper face of said lower bearing element of said hydrodynamic bearing means.

3. A bearing structure for a vertically disposed rotatable shaft, as defined in claim 2 and which further includes a normally closed oil inflow valve controlling admission of oil to said oil bath, operation of said valve to open position being automatically effected by said means responsive in the event of failure of said hydrostatic bearing means.

4. A bearing structure as defined in claim 3 for a vertically disposed rotatable shaft which further includes piston means for adjusting the height of said annular non-rotatable bearing member of said hydrostatic bearing means to the level where the upper and lower bearing elements of said hydrodynamic bearing means operate practically without load, and wherein said means responsive in the event of failure of said hydrostatic bearing means to open said valve includes means actuated by a lowering of said piston means.

5. In a bearing structure for supporting a vertically disposed rotatable shaft, the combination comprising a normal-service hydrostatic bearing means having a lower annular non-rotatable bearing member surrounding said shaft and which coacts through a pressurized lubricant film with an upper annular rotary bearing member surrounding and secured to said shaft, an emergency-service hydrodynamic bearing means spaced radially in relation to said normal-service bearing means, said emergency-service bearing means having a lower circular array of circumferentially spaced stationary bearing segments surrounding said shaft and an upper annular rotary bearing member surrounding and secured to said shaft, piston means for adjusting the height of said annular non-rotatable bearing member of said hydrostatic bearing means to the level where the upper and lower bearing elements of said hydrodynamic bearing means operate practically without load whereby said hydrostatic bearing means alone serves to carry the shaft load during normal-service, means including a wall surrounding said hydrodynamic bearing means for establishing an oil bath therein, said wall being provided with an overflow aperture located at a level substantially coincident with the upper face of said lower bearing element of said hydrodynamic bearing means, a normally closed oil inflow valve controlling admission of oil to said oil bath, the flow rate of oil through said valve being greater than the rate at which oil can be discharged through said overflow aperture, and means actuated in the event of a failure of said hydrostatic bearing means and which is accompanied by a lowering of said shaft to open said oil inflow valve, thereby to raise the level of the oil in said oil bath to a point where said rotary bearing member of said hydrodynamic bearing means is at least partially immersed in said oil bath.

References Cited
UNITED STATES PATENTS 3,165,365   1/1965   Wiedemann et al. _____ 308—170

MARTIN P. SCHWADRON, *Primary Examiner.*

F. SUSKO, *Assistant Examiner.*